March 6, 1928.

D. D. PARSHALL 1,661,266

COMPRESSOR PUMP

Filed June 2, 1924

Inventor
Dallas D. Parshall

By Whittemore Hulbert Whittemore
Belknap  Attorney

Patented Mar. 6, 1928.

1,661,266

UNITED STATES PATENT OFFICE.

DALLAS D. PARSHALL, OF DETROIT, MICHIGAN.

COMPRESSOR PUMP.

Application filed June 2, 1924. Serial No. 717,341.

The invention relates to compressors more particularly designed for use in connection with refrigerating apparatus, and the invention consists in the peculiar construction as hereinafter set forth.

Figure 1:
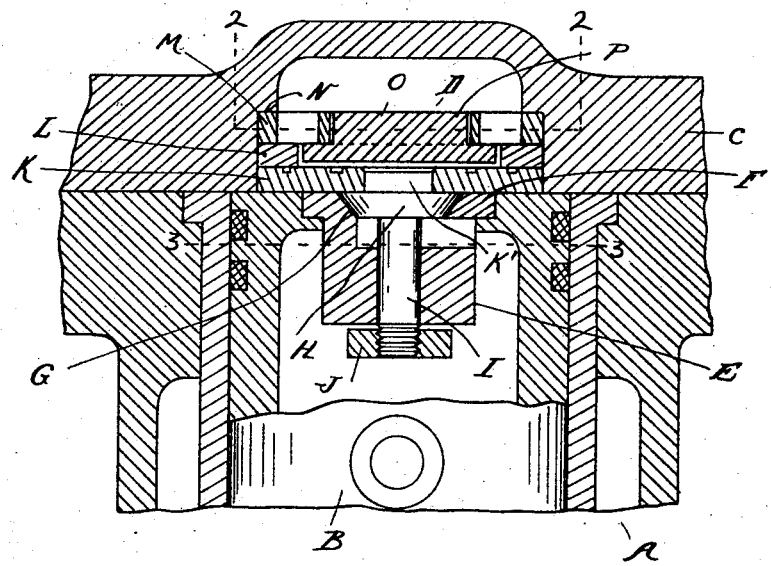
Figure 1 is a vertical central section through the compressor in the axial plane of the cylinder and piston.
Figure 2:
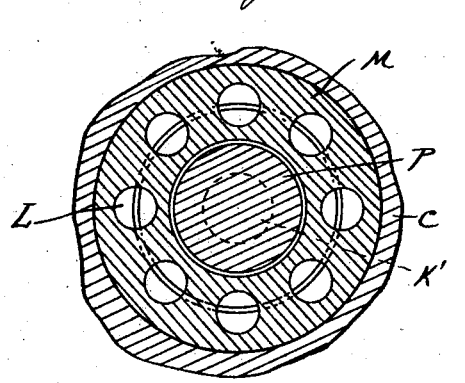
Figure 2 is a section on the line 2—2 of Figure 1.
Figure 3:
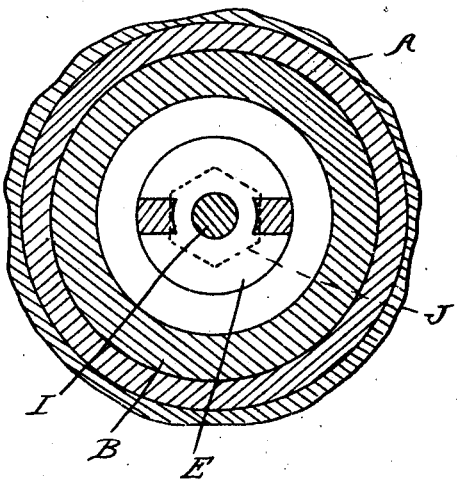
Figure 3 is a section on the line 3—3 of Figure 1.

A is a cylinder of the compressor and B is the reciprocating piston therein. C is a detachable head for the cylinder, which is recessed to receive the outlet valve assembly D, and E is the inlet valve assembly which is mounted in the head of the piston.

The inlet valve assembly comprises a bushing F which is arranged in an aperture in the piston head, preferably having a pressed fit therein. In the upper portion of this bushing there is formed a conical seat G for a poppet valve H, which latter has a depending stem I passing through the bushing and threaded at its lower end for engagement with a stop nut J. This nut may be adjusted so as to limit the amount of rise permitted to the valve and such adjustment can be effected prior to the installation of the bushing in the head of the piston.

The outlet valve assembly comprises a disc seat member K having a pressed fit within the recess in the head B and centrally apertured to form a port for the passage of the gas. Above the disc K is a spacer ring L and above this spacer ring an apertured ring M engaging a shoulder N. O is a disc valve which seats upon the disc K and which is of a thickness of but slightly less than the thickness of the spacer ring L so as to provide only a limited lift for the valve. Thus while the lift is sufficient for the outward passage of the compressed gas, it is insufficient to produce a pounding or noisy action in the lifting and seating of the valve. The valve O preferably has a guide stem P, which loosely fits a central aperture in the member M.

With the construction as described, the valve assemblies D and E can be adjusted for the proper lift of the valve before they are placed in the engine casing. The gas to be compressed is introduced into the cylinder below the piston B and, therefore, during each downward stroke of the piston the suction will cause the upward lifting of the valve H and the passage of gas to above the piston. The upward stroke of the piston will instantaneously seat the valve H and will compress the gas against the valve O, which is held to its seat by whatever pressure of gas is in the system above the valve. Also, the area exposed to gas pressure on the top of the valve is considerably greater than the area which is exposed to the gas compressed in the cylinder, so that the valve will not lift from its seat until a considerably higher pressure is attained within the cylinder than that of the gas previously compressed. Therefore, when the valve O does lift, the compressed volume within the cylinder is quickly transferred to the system above.

The one advantage of the construction as described is that clearance in the compression chamber may be reduced to the minimum, inasmuch as the valve H and its seat F are normally flush with the top of the piston and the bottom of the disk K is flush with the head of the cylinder. The only clearance is the volume of the port K' which is not a large factor. The use of springs for seating the valves is avoided and there is nothing in the assembly to get out of order after it is once installed. However, if necessary, each valve assembly can be removed from the compressor and replaced by a new assembly.

What I claim as my invention is:

1. In a compressor pump, a cylinder and a reciprocatory piston therein having a limited clearance between the adjacent head faces, and inlet and outlet valve assemblies located in recesses in the respective faces and lying flush therewith, said inlet valve being located in the piston and said outlet valve being located in the head of the cylinder and comprising a disk forming a seat, a spacer above said disk, a ported disk above said spacer having a shouldered engagement with the head, and a valve located between said seat disk and apertured disk and of a thickness but slightly less than said spacer to provide only a limited lift for the valve.

2. In a compressor pump, a cylinder and a reciprocatory piston therein, and an outlet valve comprising an apertured seat member, a disk valve above said seat member having an area considerably in excess of the area of the aperture through said seat, and means for limiting the lift of said disk from its seat without interfering with the exposure to gas pressure of the full upper face of the valve, whereby a compression pressure is attained in the cylinder correspondingly higher than the pressure above the valve before the lifting of the latter from its seat.

3. An outlet valve for a compressor pump comprising an apertured disk secured in the cylinder head and constituting a valve seat, a spacer above said disk, a ported disk above said spacer provided with a centrally disposed opening, and a disk valve located between said seat disk and apertured disk for placing the apertures of said disks in communication when unseated, said valve having a reduced centrally disposed upper portion arranged within the central opening of said ported disk for guiding the valve during its movement to and from its seat.

In testimony whereof I affix my signature.

DALLAS D. PARSHALL.